(12) United States Patent
Liu et al.

(10) Patent No.: US 11,765,583 B2
(45) Date of Patent: Sep. 19, 2023

(54) METHODS, DEVICES AND COMPUTER READABLE MEDIUM FOR AUTHENTICATION IN COMMUNICATION

(71) Applicant: Nokia Technologies Oy, Espoo (FI)

(72) Inventors: Liang Liu, Beijing (CN); Yang Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 269 days.

(21) Appl. No.: 16/977,370

(22) PCT Filed: Mar. 9, 2018

(86) PCT No.: PCT/CN2018/078574
§ 371 (c)(1),
(2) Date: Sep. 1, 2020

(87) PCT Pub. No.: WO2019/169626
PCT Pub. Date: Sep. 12, 2019

(65) Prior Publication Data
US 2021/0067963 A1     Mar. 4, 2021

(51) Int. Cl.
*H04W 12/06* (2021.01)
*H04W 76/10* (2018.01)
(Continued)

(52) U.S. Cl.
CPC ......... *H04W 12/06* (2013.01); *H04L 63/0876* (2013.01); *H04L 63/104* (2013.01); *H04W 4/08* (2013.01); *H04W 76/10* (2018.02)

(58) Field of Classification Search
CPC ....... H04W 12/06; H04W 12/08; H04W 4/08; H04W 4/70; H04W 76/10; H04L 63/0876; H04L 63/104; H04L 9/3073; H04L 9/3247
See application file for complete search history.

(56) References Cited

U.S. PATENT DOCUMENTS 9,137,226 B2 * 9/2015 Zhu ................. H04W 12/069
2005/0033957 A1    2/2005 Enokida
(Continued)

FOREIGN PATENT DOCUMENTS

CN          101938705 A      1/2011
CN          101998575 A      3/2011
(Continued)

OTHER PUBLICATIONS

Office action received for corresponding Chinese Patent Application No. 201880090968.4, dated Jul. 19, 2022, 11 pages of office action and no page of translation available.
(Continued)

Primary Examiner — Khoi V Le
(74) *Attorney, Agent, or Firm* — Lippes Mathias LLP (57) ABSTRACT

Embodiments of the disclosure provide a method, device and computer readable medium for authentication. According to embodiments of the present disclosure, only the first terminal device in a group of terminal devices which requests to connect to a network needs to finish the whole authentication. Upon the first terminal device successfully accesses to the network, the remaining terminal devices in the same group can ignore the authentication. In this way, time for authentication is reduced and the calculation efforts related to authentication is reduced for a large number for terminal devices.

7 Claims, 7 Drawing Sheets

(51) Int. Cl.
*H04L 9/40* (2022.01)
*H04W 4/08* (2009.01)

(56) References Cited

U.S. PATENT DOCUMENTS

| | | | |
|---|---|---|---|
| 2006/0053296 | A1 | 3/2006 | Busboom et al. |
| 2011/0268047 | A1 | 11/2011 | Nath et al. |
| 2013/0035067 | A1* | 2/2013 | Zhang .................. H04W 12/06 455/411 |
| 2014/0140331 | A1 | 5/2014 | Lee |
| 2014/0233736 | A1 | 8/2014 | Zhang et al. |
| 2016/0249217 | A1* | 8/2016 | Luft ...................... H04W 16/32 |
| 2017/0331828 | A1* | 11/2017 | Caldera ............... H04L 63/0807 |
| 2018/0197144 | A1* | 7/2018 | Frank .................... H04L 63/104 |

FOREIGN PATENT DOCUMENTS

| | | |
|---|---|---|
| CN | 102088668 A | 6/2011 |
| CN | 102137397 A | 7/2011 |
| CN | 102316450 A | 1/2012 |
| CN | 106034027 A | 10/2016 |
| JP | 2007179390 A | 7/2007 |
| WO | 2011/023097 A1 | 3/2011 |
| WO | 2012/097883 A1 | 7/2012 |

OTHER PUBLICATIONS

"3rd Generation Partnership Project; Technical Specification Group Services and System Aspects; Study on the security aspects of the next generation system (Release 14)", 3GPP TR 33.899, V1.3.0, Aug. 2017, 605 pages.
Su et al., "A Survey of Performance Improvement by Group-based Authentication in IoT", International Conference on Applied System Innovation (ICASI), 2016, 4 pages.
International Search Report and Written Opinion received for corresponding Patent Cooperation Treaty Application No. PCT/CN2018/078574, dated Nov. 28, 2018, 9 pages.
Extended European Search Report received for corresponding European Patent Application No. 18908334.8, dated Oct. 18, 2021, 11 pages.
Office action received for corresponding Indian Patent Application No. 202047042794, dated Sep. 6, 2021, 8 pages.

* cited by examiner

METHODS, DEVICES AND COMPUTER READABLE MEDIUM FOR AUTHENTICATION IN COMMUNICATION

RELATED APPLICATION

This application claims priority to PCT Application No. PCT/CN2018/078574, filed on Mar. 9, 2018, of which is incorporated herein by reference in its entirety.

TECHNICAL FIELD

Embodiments of the present disclosure generally relate to communication techniques, and more particularly, to methods, devices and computer readable medium for authentication in communication.

BACKGROUND

In communication systems, before a terminal device accesses to a network, there is usually an authentication process between the terminal device and entities in the network. For example, in the third generation wireless communication (3G) system or Long Term Evolved (LTE) communication system, the authentication mechanism employs message authentication codes to verify the terminal device and the entities. While in the fifth generation wireless communication system (5G), such traditional authentication mechanism may have some problems due to an increasing number of terminal devices. For example, in Internet of Things (IoT), there are a large number of terminal devices. It may consume a lot of calculation resources for the network to perform the authentication for all of the terminal devices.

SUMMARY

In general, embodiments of the present disclosure relate to a method for authenticating terminal devices and the corresponding network device and terminal device.

In a first aspect, embodiments of the present disclosure provide a method implemented at a network device for communication. The method comprises: receiving, from a terminal device in a group of terminal devices, a connection request. The connection request comprises an identity of the terminal device. The method also comprises: obtaining a group identity based on the identity of the terminal device. The method further comprises: determining a group status of the group based on the group identity. The group status relates to historical access of the group of terminal devices to the network. The method also comprise: transmitting, to the terminal device, a response to the connection request at least in part based on the group status of the group.

In a second aspect, embodiments of the present disclosure provide a method implemented at a terminal device for communication. The method comprises: transmitting, to a network device in a network, a connection request. The connection request comprises an identity of the terminal device. A group identity is obtained based on the identity. The method further comprises receiving, from the network device, a response to the connection request at least in part based on a group status of the group. The group status is obtained based on the group identity and related to historical access of the group of terminal devices to the network.

In a third aspect, embodiments of the disclosure provide a network device. The network device comprises: at least one processor; and at least one memory including computer program codes. The at least one memory and the computer codes are configured to, with the at least one processor, cause the network device to: receive, from a terminal device in a group of terminal devices a connection request. The connection request comprises an identity of the terminal device. The at least one memory and the computer codes are configured to, with the at least one processor, also cause the network device to: obtain a group identity based on the identity of the terminal device. The at least one memory and the computer codes are configured to, with the at least one processor, further cause the network device to: determine a group status of the group based on the group identity. The group status relates to historical access of the group of terminal devices to the network. The at least one memory and the computer codes are configured to, with the at least one processor, also cause the network device to: transmit, to the terminal device, a response to the connection request at least in part based on the group status of the group.

In a fourth aspect, embodiments of the disclosure provide a terminal device. The terminal device comprises: at least one processor; and at least one memory including computer program codes. The at least one memory and the computer program codes are configured to, with the at least one processor, cause the terminal device to: transmit, to a network device in a network, a connection request. The connection request comprises an identity of the terminal device. The identity is used for obtaining a group identity. The at least one memory and the computer program codes are configured to, with the at least one processor, also cause the terminal device to: receive, from the network device, a response to the connection request at least in part based on a group status of the group. The group status is determined based on the group identity and related to historical access of the group of terminal devices to the network.

In a fifth aspect, embodiments of the disclosure provide a computer readable medium. The computer readable medium stores instructions thereon, the instructions, when executed by at least one processing unit of a machine, causing the machine to implement the method according to the first aspect of the present disclosure.

In a sixth aspect, embodiments of the disclosure provide a further computer readable medium. The further computer readable medium stores instructions thereon, the instructions, when executed by at least one processing unit of a machine, causing the machine to implement the method according the second aspect of the present disclosure.

In a seventh aspect, embodiments of the disclosure provide an apparatus for communication. The apparatus comprises means for receiving, from a terminal device in a group of terminal devices a connection request. The connection request comprises an identity of the terminal device. The apparatus further comprises means for obtaining a group identity of the group of terminal devices based on the identity of the terminal device. The apparatus also comprises means for determining a group status of the group based on the group identity. The group status relates to historical access of the group of terminal devices to the network. The apparatus comprises means for transmitting, to the terminal device, a response to the connection request at least in part based on the group status of the group.

In an eight aspect, embodiments of the disclosure provide a further apparatus for communication. The apparatus comprises means for transmitting, to a network device in a network, a connection request comprising an identity of the terminal device. The connection request is used for obtaining a group identity of the group of terminal devices. The apparatus also comprise means for receiving, from the network device, a response to the connection request at least in part based on a group status of the group. The group status is determined based on the group identity and related to historical access of the group of terminal devices to the network.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Some example embodiments will now be described with reference to the accompanying drawings, where.

Throughout the figures, same or similar reference numbers indicate same or similar elements.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The teen "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As described above, in communication systems, there is often an authentication process between the terminal devices and the entities in the network. Communication systems, such as 3G systems or 4G systems, usually use message authentication codes. It often takes some time to finish the authentication process. There are also some signaling transmitted among the terminal device and the entities during the authentication.

However, in the 5G system, especially in the scenario of Internet of Things (IoT), since the terminal devices are everywhere, there are a huge number of connections between the terminal devices and the network. The conventional authentication mechanism may take very long time to authenticate the terminal devices in the IoT and bring signaling storm.

In order to at least in part solve above and other potential problems, Embodiments of the present disclosure provide a salutation for authenticating terminal devices. Generally speaking, according to embodiments of the present disclosure, for a group of terminal device, only the first terminal device accessing to a network need to complete a whole authentication process. The remaining terminal devices in the same group may ignore the authentication process if they request to access to the network.

Now some example embodiments of the present disclosure are described below with reference to the figures. Those skilled in the art would readily appreciate that the detailed description given herein with respect to these figures is for explanatory purpose as the present disclosure extends beyond theses limited embodiments.

Figure 1:
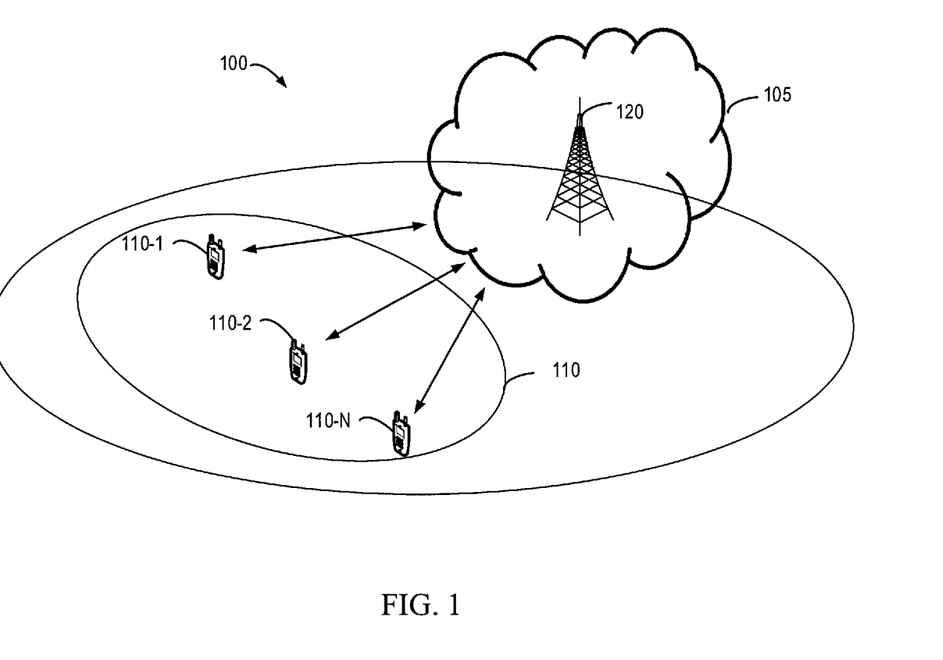
FIG. 1 illustrates a schematic diagram of a communication system according to embodiments of the present disclosure.

FIG. 1 illustrates a schematic diagram of a communication system in which embodiments of the present disclosure can be implemented. The communication system 100, which is a part of a communication network, comprises a network device 120 and terminal devices 110-1, 110-2, ... , and 110-N, which can be collectively referred to as "terminal device(s)" 110. It is to be understood that the number of network devices and terminal devices shown in FIG. 1 is given for the purpose of illustration without suggesting any limitations. The communication system 100 may comprise any suitable number of network devices and terminal devices. It should be noted that the communication system 100 may also comprise other elements which are omitted for the purpose of clarity. The network device 120 may communicate with the terminal devices 110.

The terminal devices 110-1, 110-2, ... , 110-N belong to the same group of terminal devices 110. Only by way of example, in the scenario of IoT, the terminal devices which have a similar application may be categorized into a same group. For example, the shared bicycles or vehicles may be classified into the same group of terminal devices. Alternatively, or in addition, in some embodiments, the terminal devices may also be categorized based on locations. For example, the terminal devices in a same industry product line may be categorized into the same group. Alternatively or in addition, in some embodiments, the terminal devices which require the same quality of service (QoS) may be classified into the same group. It is to be understood that the terminal devices may be categorized into groups based on any suitable conditions with any suitable methods. The present disclosure is not limited in this aspect.

The network device 120 may be an entity in a network 105. For example, the network device 120 may be a mobility management entity (MME). The network device 120 may also be an entity with an access and mobility management function (AMF). Alternatively, or in addition, in some embodiments, the network device 120 may be an entity with an authentication server function (AUSF). In some embodiments, the network 105 may also comprise other network device (not shown). For example, the network 105 may comprise a home subscriber server (HSS). In yet another embodiment, the network 105 may comprise a home gateway or an entity in a home environment (HE).

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
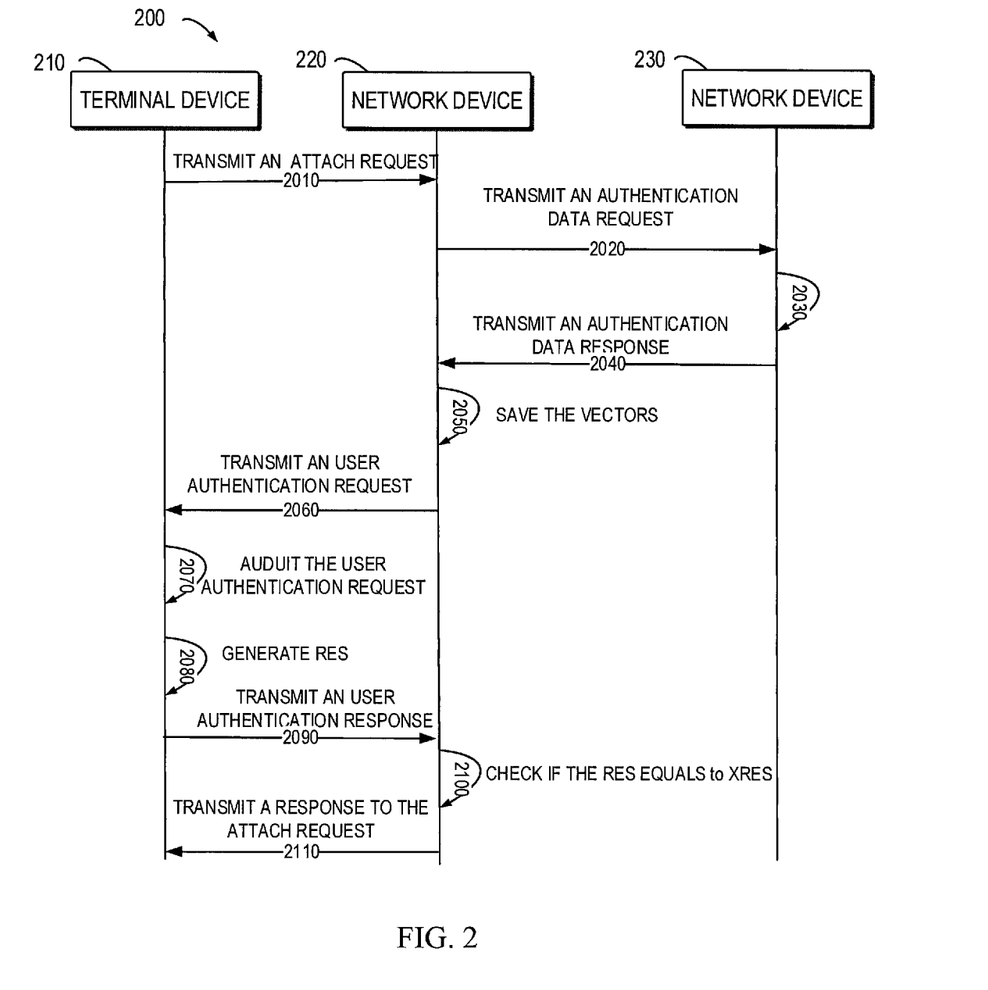
FIG. 2 is a schematic diagram illustrating interactions among terminal devices and network devices according to conventional technologies.

FIG. 2 is a schematic diagram 200 illustrating interactions among terminal devices and network devices according to conventional technologies. As described above, the conventional authentication mechanisms use message authentication codes for authenticating terminal devices, where a root key is shared between a terminal device and a network device. FIG. 2 shows an example authentication process among a terminal device 210, a network device 220 and a further network device 230.

The terminal device 210 may transmit 2010 an attach request to the network device 220. Upon receiving the attach request, the network device 220.

Upon receiving the authentication data request, the further network device 230 may generate a cipher key (CK) and integrity key (IF) based on the shared root key. The further network device 230 may generate 2030 authentication vectors. The further network device 230 may transmit 2040 an authentication data response to the network device 220. The authentication data response may comprise the generated authentication vector. The authentication data response may comprise other information generated by the further network device 230. For example, the authentication data response may also comprise a random number (RAND). Additionally, the authentication data response may comprise an authentication token (AUTN). The authentication data response may comprise an expected response (XRES) as well. The network device 220 may save 2050 the vectors.

The network device 220 may transmit 2060 a user authentication request to the terminal device 210. The user authentication request may contain related parameters which the message authentication code value. The related parameters may comprise the RAND and/or the AUTH. The terminal device 210 may calculate an expected authentication message code and XRES to authenticate 2070 the network. The terminal device 210 may generate 2080 RES and transmit 2090 a user authentication response to the network device 220. The user authentication response may comprise the generated RES. The network device 220 may check 2100 if the RES equals to the XRES. The network device 220 may transmit 2110 a response to the attach request based on the checking results. For example, if the RES equals to the XRES, the network device 220 may successfully authenticate the terminal device 210 and transmit the response to indicate that the attach request is accepted.

It will be appreciated that the interactions according to the traditional authentication, as shown in FIG. 2, usually take a relatively long period of time to complete the authentication. Since every terminal device needs to complete the whole authentication as long as accessing to the network, the authentication may take very long time if there are many terminal devices. Besides, there may be a huge number of signaling due to the number of the terminal devices. Thus, a new authentication solution is needed.

Different from the above authentication procedure, the present disclosure provides an IBC-based method for authenticating terminal devices. Identity-based cryptography (IBC) is a public-key cryptography that adopts the bilinear mapping technique, which does not require rules to pre-compute key pairs or obtain certificates for their public keys. Instead, the public keys can be any identifiers such as email addresses, while private keys are derived at any time by a trusted private key generator upon request by the designated principals.

Figure 3:
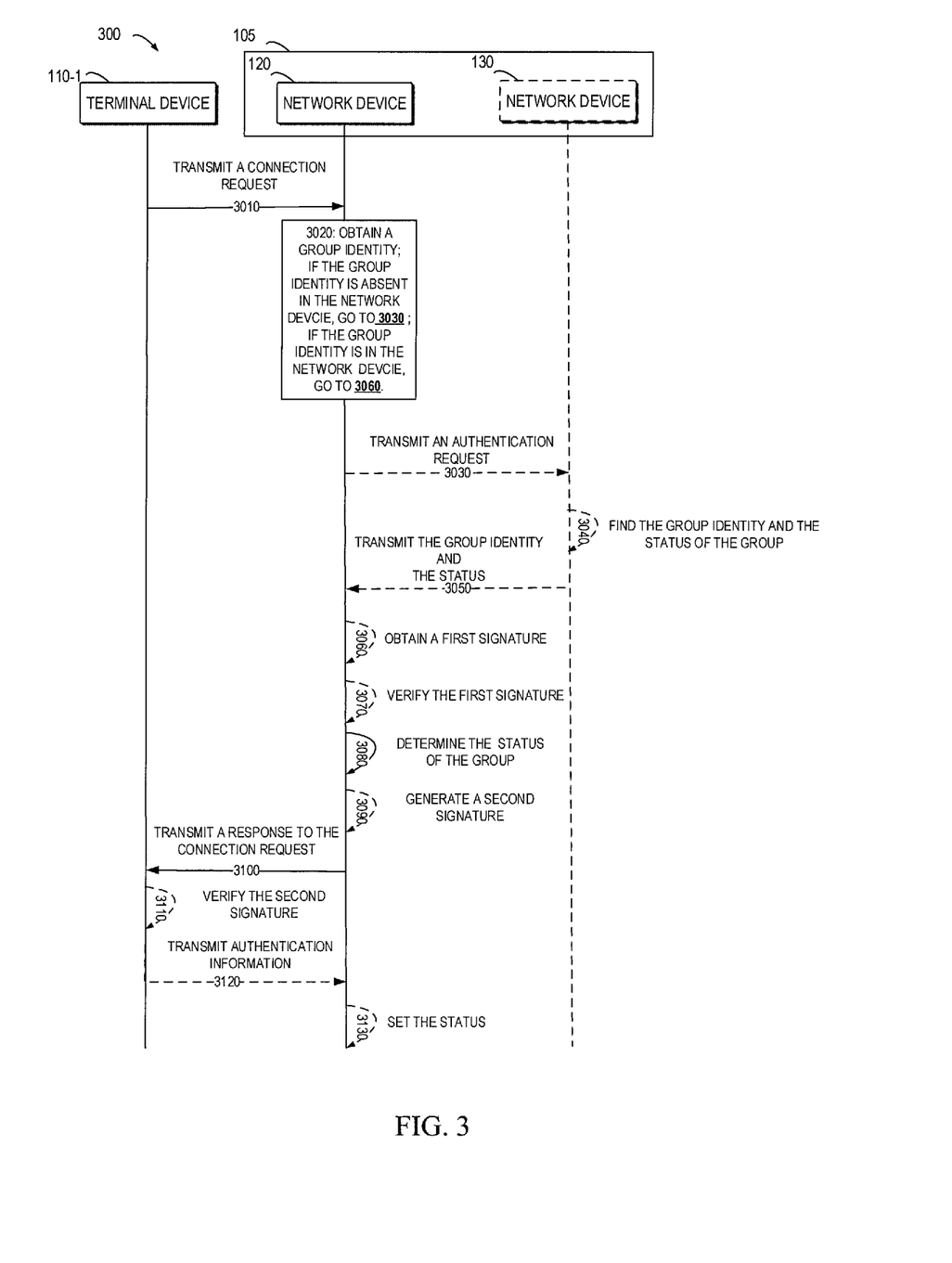
FIG. 3 is a schematic diagram illustrating interactions among terminal devices and network devices according to embodiments of the present disclosure.

FIG. 3 is a schematic diagram 300 illustrating interactions among the terminal device and the network devices. As shown in FIGS. 1 and 3, the terminal device 110-1 belongs to the group of terminal devices 110. The group identity of each group is shared between the respective group and the network 105.

The terminal device 110-1 transmits 3010 a connection request to the network device 120 in the network 105. The connection request comprises the identity of the terminal device 110-1. For example, the identity of the terminal device 110-1 may comprise, but not limit to, an international mobile subscriber identity (IMSI) of the terminal device 110-1, a packet-temporary mobile subscriber identity (P-TMSI) of the terminal device 110-1 a globally unique temporary UE identity (GUTI) of the terminal device 110-1. It is to be understood that the connection request may comprise any one or any combination of the aforementioned identities. Alternatively, or in addition, the connection request may comprise a signature of the terminal device 110-1 (referred to as "first signature" hereinafter). In some embodiments, as will be described below, the first signature may be verified by the network device 120 during authentication. In some embodiments, the connection request may be an accessing request to the network 105. In other embodiments, the connection request may be a service request. It is to be understood that the connection request may any kinds of suitable requests.

Upon receiving the connection request, the network device 120 obtains 3020 the group identity of the group of terminal devices based on the identity of the terminal device. In some embodiments, the network device 120 may map the identity of the terminal device 110-1 to the group identity based on a pre-defined mapping. As described above, the group identity of each group is shared between the respective group and the network 105. In some embodiments, if a terminal device enters the group 110, the identity of the terminal device is stored associated with the group identity and such information is updated to the network 105.

In some embodiments, the pre-defined mapping may be generated upon the terminal devices are categorized into the group. The pre-defined mapping may be stored in the network. Each group of terminal devices has a respective pre-defined mapping. For example, all of the pre-defined mapping of each group may be stored in a further communication device 130 with a large amount of storing space and/or in a remote storage device which can be accessed by the further communication device 130. In an example embodiment, the pre-defined mappings of some groups may also be stored in the network device 120.

In an example embodiment, the pre-defined mapping may be stored in the form of table. Alternatively, the pre-defined mapping may be stored in the form of tree. It is to be understood the pre-defined mapping may be stored in any suitable manners.

If the group identity is not pre-stored in the network device 120, the network device 120 may not find the group identity corresponding to the identity of the terminal device 110-1 In such situation, the network device 120 may transmit 3030 an authentication request to the further network device 130 in the network 105, in order to obtain the group identity and a group status of the group. The authentication request may comprise the identity of the terminal device 120. For example, the authentication request may comprise the IMSI of the terminal device 110-1. Alternatively, or in addition, the authentication request may comprise a serving network (SN) identity. In other embodiments, the authentication request may comprise a network type. It is to be understood that the present disclosure is not limited in the aspect.

In an example embodiment, the further network device 130 may be a HSS. Alternatively, or in addition, the further network device 130 may be a home gateway or an entity in a home environment (HE). As described above, the further network device 130 may store the mapping between identities of terminal devices and identities of groups. For example, the further network 130 may store the mapping relationship between the identities of the terminal devices 110-1, 110-2, . . . , 110-N and the group identity of the group 110. In other embodiment, the further network device 130 may be able to access to a remote storage which stores the mapping relationship.

In some embodiments, upon receiving the authentication request from the network device 120, the further network device 130 may find 3040 the group identity based on the identity of the terminal device 110-1. As described above, the further network device 130 stores all the mapping between identities of terminal devices and identities of groups locally or remotely. The further network device 130 may look up the group identity of the group 110 corresponding to the identity of the terminal device 110-1 in the mapping relationship. The group identity of the group 110 may be represented as "Vtl_Grp_ID."

The further network device 130 may also store group status of each group. The group status relates to historical access of the group of terminal devices to the network 105. The group identity has one or more attribute to indicate the group status. For example, the group status may be a Boolean value. In other embodiments, the group status may be a bit in the group identity. For example, if the group status is "0" (false), it means that there is no terminal device in the group accessing to the network previously. If the group status is "1" (true), it means that there is at least one terminal device in the group accessing to the network previously.

The further network device 130 may transmit 3050 the group identity and the group status to the network device 120. The network device 120 may store the group identity and the group status from the further network device 130. In this way, the further network device 130 does not need to generate authentication vectors and the space for storing the authentication vectors at the network device 120 is saved.

In some embodiments, the network device 120 may obtain 3060 the first signature from the received connection request, and then verify 3070 the first signature based on a public key derived from the group identity. In an example embodiment, since IBC is a public-key cryptography, the first signature may be decrypted using the public key obtained from the group identity (i.e., the public key). If the network device 120 fails to verify the first signature, the network device 120 may deny the connection request.

The network device 120 determines 3080 the group status of the group 110. If the group identity is in the network device 120, the network device 120 determines 3060 the group status of the group 110 based on the group identity. As described above, the group status relates to historical access of the group of terminal devices to the network 105.

If the group status indicates that there is at least one terminal device in the group 110 accessing to the network 105 previously, it means that the terminal device 110-1 is not the first terminal device in the group 110 requesting to access to the network 105. In this situation, the network device 120 transmits 3100 a response to the connection request. The response may indicate that the connection request is approved and the terminal device 110-1 may ignore the following authentication and connect to the network directly. In this way, both the network device 120 and the terminal device 110-1 can reduce time for authentication, thereby improving the efficiency of authentication.

In some embodiments, the response may comprise an auth_pass_ind indicator. In this way, if the network device 120 pre-stores the group identity, the network device does not need to communicate with the further network device 130 for authentication, which reduces the number of signaling and saves time compared with the conventional technologies. Further, the terminal device 110-1 does not need to authenticate the network 105, which reduces the calculation burden on the terminal device 110-1.

In some embodiments, if the group status indicates that there is none of the terminal devices in the group 110 has ever accessed to the network 105 previously, it can be determined that the connection request is associated with an initial access of the group 110 to the network 105 and the terminal device 110-1 is the first terminal device in the group 110 requesting to access to the network 105. In some embodiments, upon verifying 3070 the first signature, the network device 120 may generate 3090 its signature (referred to as "second signature" hereinafter) to be verified by the terminal device 110-1. The network device 120 transmits 3100 a response to the connection request comprising the second signature and the verifying result of the first signature.

In some embodiments, upon receiving the response to the connection request comprising the second signature, the terminal device 110-1 may verify 3110 the second signature to authenticate the network 105 based on a public identity of the network device 120. If the terminal device 110-1 verifies the second signature successfully and authenticates the network, the terminal device 110-1 may transmit 3120 the authentication information to the network device 120. Upon receiving the authentication, the network device 120 may set the group status of the group 110 to indicate that at least one of the terminal devices in the group 110 has accessed to the network 105.

In this way, for a group of terminal devices, only the first terminal device accessing to the network needs to complete the whole authentication process and the remaining terminal devices in the same group can ignore the authentication, thereby saving a lot of calculating efforts and authenticating time. Further, there is no dedicated authentication message between the terminal device and the network device.

Figure 4:
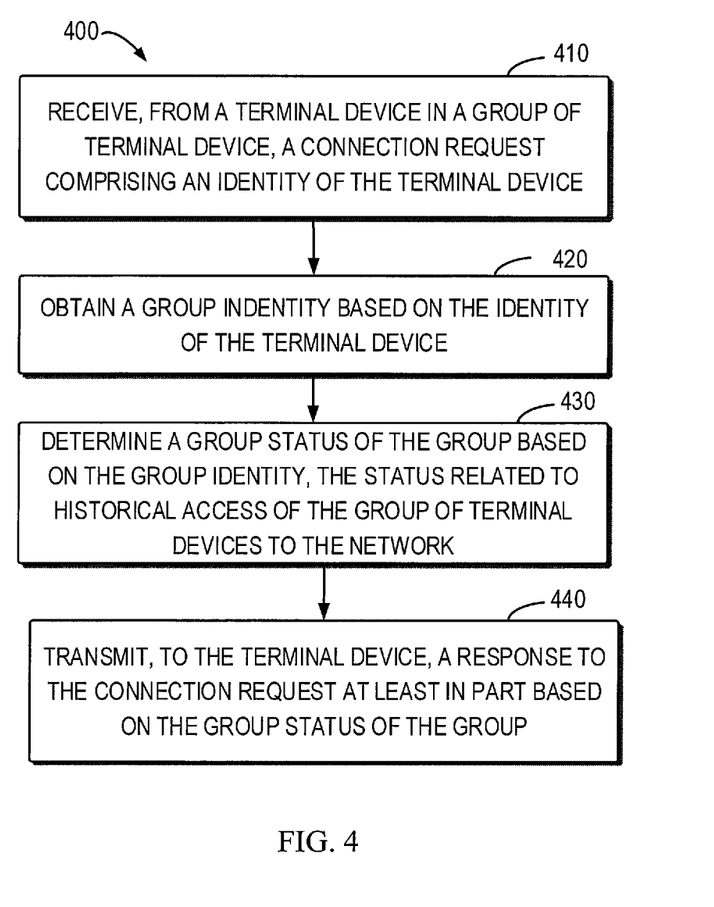
FIG. 4 illustrates a flowchart of a method implemented at a terminal device for communication according to embodiments of the present disclosure.

FIG. 4 illustrates a flowchart of method 400 in accordance with an example of the present disclosure. The method 600 may be implemented at the network device 120.

At block 410, the network device 120 receives a connection request from the terminal device 110-1 in the group of terminal device 110. The connection request comprises an identity of the terminal device 110-1. In some embodiments, the network device 120 may obtain the first signature in the connection request. The first signature may be verified by the network device 120 based on the public key derived from the group identity.

At block 420, the network device 120 obtains the group identity based on the identity of the terminal device 110-1. In some embodiments, the network device 120 may determine whether the group identity is stored in the network device 120 or not. In an example embodiment, if the network device 120 determines that the group identity is not in the network device 120, the network device 120 may transmit an authentication request to obtain the group identity to the further communication device 130.

In some embodiments, the further network device 130 stores all the mapping between identities of terminal devices and identities of groups locally or remotely. The further network device 130 may look up the group identity of the group 110 corresponding to the identity of the terminal device 110-1 based on the mapping. The further network device 130 may transmit the group identity to the network device 120.

At block 430, the network device 120 determines the group status of the group 110 based on the group identity. The group status relates to historical access of the group of terminal devices to the network 105. In an example embodiment, the group status indicates whether there is at least one terminal device in the group 110 accessing to the network 105 previously.

Figure 5:
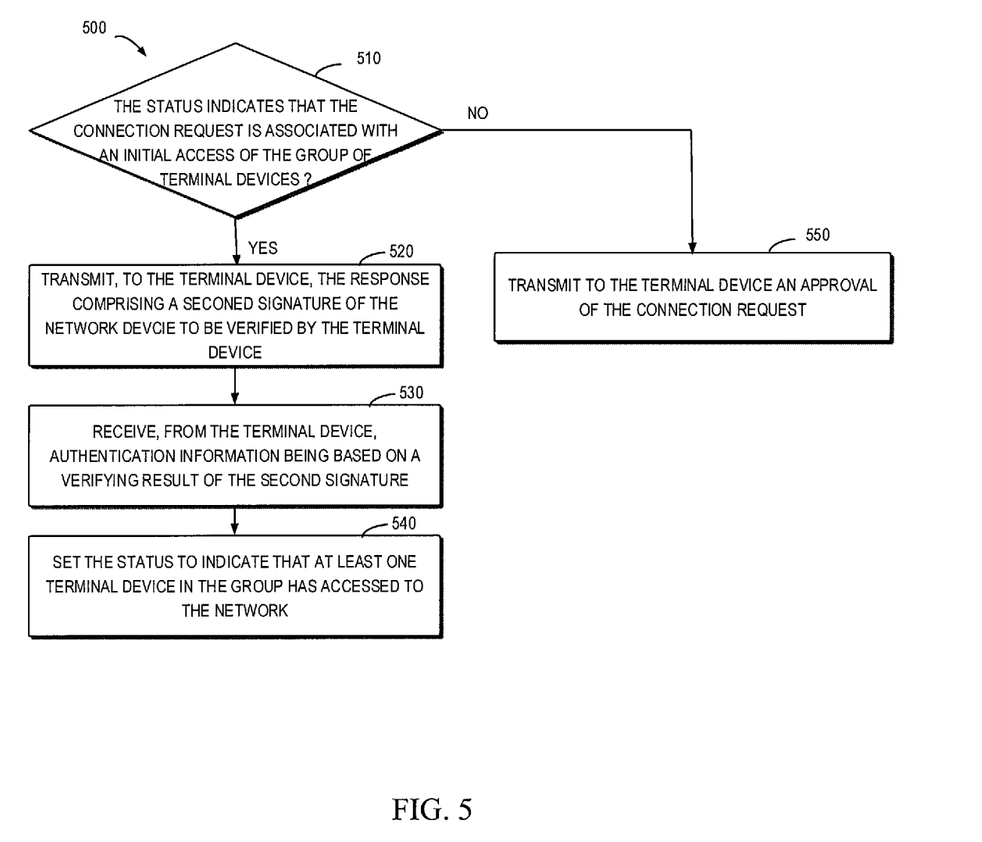
FIG. 5 illustrates a flowchart of a method implemented at a network device for communication according to embodiments of the present disclosure.

At block 440, the network device 120 transmits a response to the connection request at least in part based on the group status of the group to the terminal device 110-1. FIG. 5 illustrates a flowchart of method 500 that can be implemented at block 430. An example embodiment of the present disclosure is described below with the reference to FIG. 5.

At block 510, the network device 120 may determine whether the group status indicates that the connection request is associated with an initial access of the group of terminal devices 110.

If the group status indicates that there is no terminal device in the group 110 having accessed to the network 105 previously, and the network device 120, at block 520, verifies the first signature successfully, the network device 120 may transmit a second signature to be verified by the terminal device 110-1. If the network device 120 fails to verify the first signature, the network device 120 may deny the connection request.

At block 530, the network device 120 may receive authentication information from the terminal device. The authentication information is based on the verifying result of the second signature. If the authentication information indicates the second signature is verified successfully, at block 540, the network device 120 may set the group status to indicate that at least one terminal device in the group 110 has accessed to the network 105.

In some embodiments, if the group status indicates that there is one or more terminal devices in the group 110 has accessed to the network 105 before, at block 550, the network device 120 may transmit an approval of the connection request to the terminal device 110-1.

In some embodiments, an apparatus for performing the method 500 (for example, the terminal device 110-1) may comprise respective means for performing the corresponding steps in the method 500. These means may be implemented in any suitable manners. For example, it can be implemented by circuitry or software modules.

In some embodiments, the apparatus comprises: means for receiving, from a terminal device in a group of terminal devices, a connection request comprising an identity of the terminal device; means for obtaining a group identity of the group of terminal devices based on the identity of the terminal device; means for determining a group status of the group based on the group identity, the group status related to historical access of the group of terminal devices to the network; and means for transmitting, to the terminal device, a response to the connection request at least in part based on the group status of the group.

In some embodiments, the means for obtaining a group identity of the group and a group status of the group comprises: means for, in response to determining that the group identity is absent in the network device, transmitting, to a further network device in the network, a further request to obtain the group identity; and means for receiving, from the further network device, the group identity and the group status.

In some embodiments, the means for transmitting a response to the connection request comprises: means for obtaining a first signature of the terminal device from the connection request; means for verifying the first signature; and means for in response to the first signature being successfully verified and the group status indicating that the connection request is associated with an initial access of the group of terminal devices to the network, transmitting, to the terminal device, the response comprising a second signature of the network device to be verified by the terminal device.

In some embodiments, the apparatus further comprises: means for receiving, from the terminal device, authentication information provided based on a verifying result of the second signature; and means for in response to determining from the authentication information that the second signature is successfully verified, setting the group status to indicate that at least one terminal device in the group has accessed to the network.

In some embodiments, the means for transmitting a response to the connection request comprises: means for obtaining a first signature of the terminal device from the connection request; means for verifying the first signature; and means for in response to the first signature being successfully verified and the group status indicating that at least one terminal device in the group of terminal devices has previously successfully accessed to the network, transmitting, to the terminal device, an approval of the connection request.

Figure 6:
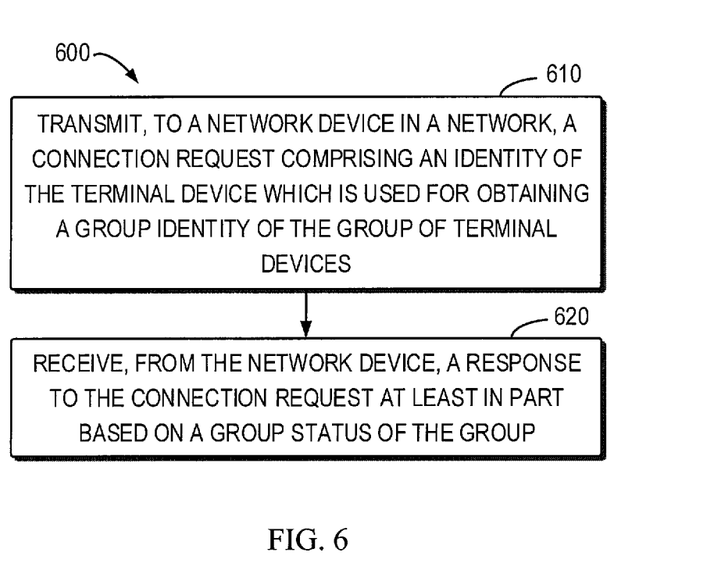
FIG. 6 illustrates a flowchart of a method implemented at a terminal device for authentication according to embodiments of the present disclosure.

FIG. 6 illustrates a flowchart of method 600 in accordance with an example of the present disclosure. The method 600 may be implemented at the terminal device 110-1.

At block 610, the terminal device 110-1 transmits the connection request to the network device 120 in the network 105. The connecting device comprises the identity of the terminal device 110-1. The identity of the terminal device 110-1 is used by the network device 120 to obtain the group identity of the group 110. In some embodiments, the terminal device 110-1 may transmit the first signature comprised in the connection request. The first signature may be verified by the network device 120.

At block 620, the terminal device 110-1 receives the response to the connection request from the network device 120. The response is based on the group status of the group which relates to historical access of the group of terminal devices to the network 105. The group status is determined based on the group identity.

In some embodiment, if the terminal device 110-1 is the first terminal device in the group accessing to the network 105, which means that the group status indicates the connection request is associated with initial access to the network 105 and the first signature is successfully verified, the terminal device 110-1 may receive the response comprising the second signature to be verified. The terminal device 110-1 may verify the second signature and transmit authentication information based on the verifying result to the network device 120.

In some embodiments, the terminal device 110-1 is not the first terminal device in the group accessing to the network 105, which means that the group status indicates that one or more terminal devices in the group 110 have accessed to the network 105 before, the terminal device 110-1 may receive an approval of the connection request from the network device 120.

In some embodiments, an apparatus for performing the method 600 (for example, the network device 120) may comprise respective means for performing the corresponding steps in the method 600. These means may be implemented in any suitable manners. For example, it can be implemented by circuitry or software modules.

In some embodiments, the apparatus comprises: means for transmitting, to a network device in a network, a connection request comprising an identity of the terminal device which is used for obtaining a group identity of the group of terminal devices; and means for receiving, from the network device, a response to the connection request at least in part based on a group status of the group, the group status being determined based on the group identity and related to historical access of the group of terminal devices to the network.

In some embodiments, the means for receiving a response to the connection request comprises: means for transmitting, to the network device in the network, a first signature of the terminal device to be verified by the terminal device; and means for in response to the first signature being successfully verified and the group status indicating that the connection request is associated with an initial access of the group of terminal devices to the network, receiving, from the network device, the response comprising a second signature of the network device.

In some embodiments, the apparatus further comprises: means for verifying the second signature; and means for transmitting, to the network device, authentication information being based on a verifying result of the second signature.

In some embodiments, the means for receiving a response to the connection request comprises: means for transmitting, to the network device in the network, a first signature of the terminal device to be verified by the network device; and means for in response to the first signature being successfully verified and group status indicating that at least one terminal device in the group of terminal devices has previously accessed to the network, receiving, from the network device, an approval of the connection request.

Figure 7:
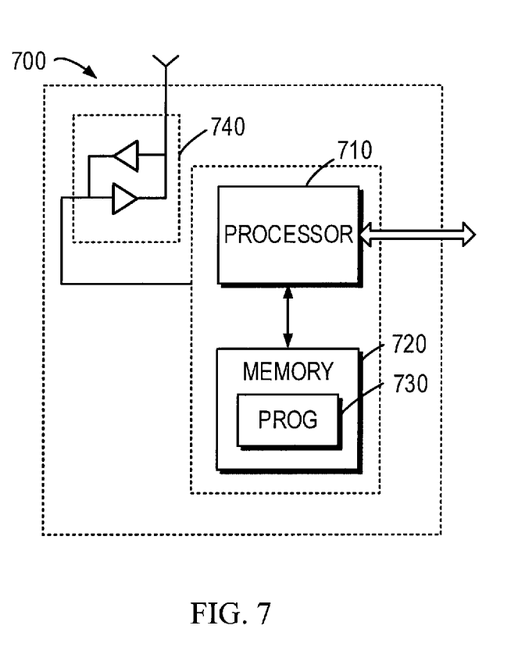
FIG. 7 illustrates a schematic diagram of a device according to embodiments of the present disclosure.

FIG. 7 is a simplified block diagram of a device 700 that is suitable for implementing embodiments of the present disclosure. The device 700 may be implemented at the network device 120. The device 700 may also be implemented at the terminal devices 110. As shown, the device 700 comprises one or more processors 710, one or more memories 720 coupled to the processor(s) 710, one or more transmitters and/or receivers (TX/RX) 740 coupled to the processor 710.

The processor 710 may be of any type suitable to the local technical network, and may comprise one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 720 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements.

The program 730 is assumed to comprise program instructions that, when executed by the associated processor 710, enable the device 700 to operate in accordance with the embodiments of the present disclosure, as discussed herein with reference to FIGS. 3 to 6. That is, embodiments of the present disclosure can be implemented by computer software executable by the processor 710 of the device 700, or by hardware, or by a combination of software and hardware.

In the context of the present disclosure, the computer program code or related data may be carried by any suitable carrier to enable the device, apparatus, or processor to perform the various processes and operations described above. Examples of carriers include signals, computer readable media and the like.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be comprised within the scope of the appended claims. Although specific terms are used herein, they are used in a generic and descriptive sense only and not for purpose of limitation.

What is claimed is:

1. A method implemented at a terminal device in a group of terminal devices for communication, comprising:
   transmitting, to a network device in a network, a connection request comprising an identity of the terminal device which is used for obtaining a group identity of the group of terminal devices; and
   receiving, from the network device, a response to the connection request at least in part based on a group status of the group, the group status being determined based on the group identity and related to historical access of the group of terminal devices to the network, wherein receiving the response to the connection request comprises:
   transmitting, to the network device in the network, a first signature of the terminal device to be verified by the network device; and
   a) in response to the first signature being successfully verified and the group status indicating that at least one terminal device in the group of terminal devices has successfully accessed to the network previously, receiving, from the network device, an approval of the connection request, thereby reducing time and improving efficiency of authentication; or
   b) in response to the first signature being successfully verified and the group status indicating that the connection request is associated with an initial access of the group of terminal devices to the network, receiving, from the network device, the response comprising a second signature of the network device.

2. The method of claim 1, further comprising:
   verifying the second signature; and
   transmitting, to the network device, authentication information provided based on a verifying result of the second signature.

3. A network device, comprising:
   at least one processor; and
   at least one memory including computer program codes;
   the at least one memory and the computer program codes configured to, with the at least one processor, cause the network device to:
   receive, from a terminal device in a group of terminal devices, a connection request comprising an identity of the terminal device;

obtain a group identity of the group of terminal devices based on the identity of the terminal device;

determine a group status of the group based on the group identity, the group status related to historical access of the group of terminal devices to a network; and transmit, to the terminal device, a response to the connection request at least in part based on the group status of the group, wherein transmit the response to the connection request comprises:

obtain a first signature of the terminal device from the connection request;

verify the first signature; and a) in response to the first signature being successfully verified and the group status indicating that at least one terminal device in the group of terminal devices has successfully accessed to the network previously, transmit, to the terminal device, an approval of the connection request, thereby reducing time and improving efficiency of authentication; or    b) in response to the first signature being successfully verified and the group status indicating that the connection request is associated with an initial access of the group of terminal devices to the network, transmit, to the terminal device, the response comprising a second signature of the network device to be verified by the terminal device.

4. The network device of claim 3, wherein in obtaining a group identity of the group and a group status of the group, the at least one memory and the computer program codes are configured to, with the at least one processor, cause the network device to:

in response to determining that the group identity is absent in the network device, transmit, to a further network device in the network, a further request to obtain the group identity; and receive, from the further network device, the group identity and the group status.

5. The network device of claim 3, wherein the at least one memory and the computer program codes are configured to, with the at least one processor, further cause the network device to:

receive, from the terminal device, authentication information provided based on a verifying result of the second signature; and in response to determining from the authentication information that the second signature is successfully verified, set the group status to indicate that at least one terminal device in the group has successfully accessed to the network.

6. A terminal device, comprising:

at least one processor; and at least one memory including computer program codes;

the at least one memory and the computer program codes configured to, with the at least one processor, cause the terminal device to:

transmit, to a network device in a network, a connection request comprising an identity of the terminal device which is used for obtaining a group identity of the group of terminal devices the terminal device belongs to; and receive, from the network device, a response to the connection request at least in part based on a group status of the group, the group status being determined based on the group identity and related to historical access of the group of terminal devices to the network, wherein receive the response to the connection request comprises:

transmit, to the network device in the network, a first signature of the terminal device to be verified by the network device; and    a) in response to the first signature being successfully verified and the group status indicating that at least one terminal device in the group of terminal devices has successfully accessed to the network previously, receive, from the network device, an approval of the connection request, thereby reducing time and improving efficiency of authentication; or    b) in response to the first signature being successfully verified and the group status indicating that the connection request is associated with an initial access of the group of terminal devices to the network, receive, from the network device, the response comprising a second signature of the network device.

7. The terminal device of claim 6, wherein the at least one memory and the computer program codes are configured to, with the at least one processor, cause the terminal device to:

verify the second signature; and transmit, to the network device, authentication information being based on a verifying result of the second signature.

\* \* \* \* \*